United States Patent
Grossmann

(10) Patent No.: US 6,655,246 B2
(45) Date of Patent: Dec. 2, 2003

(54) MACHINE TOOL

(75) Inventor: Walter Grossmann, Baltmannsweiler (DE)

(73) Assignee: Index-Werke GmbH & Co. KG Hahn & Tessky, Esslingen (DE)

(*) Notice: Subject to any disclaimer, the term of this patent is extended or adjusted under 35 U.S.C. 154(b) by 38 days.

(21) Appl. No.: 10/024,447

(22) Filed: Dec. 18, 2001

(65) Prior Publication Data

US 2002/0122708 A1 Sep. 5, 2002

Related U.S. Application Data

(63) Continuation of application No. PCT/EP01/02675, filed on Mar. 9, 2001.

(30) Foreign Application Priority Data

Apr. 20, 2000 (DE) .......................................... 100 19 788

(51) Int. Cl.[7] .................................................. B23B 9/00
(52) U.S. Cl. ............................. 82/117; 82/132; 82/149; 82/123
(58) Field of Search .......................... 82/117, 118, 120, 82/121, 129, 132, 133, 149, 123; 29/27 C, 33 R; 408/33, 42

(56) References Cited

U.S. PATENT DOCUMENTS 4,417,843 A 11/1983 Bonga
4,840,095 A * 6/1989 Nussbaumer et al. ......... 82/117
5,060,355 A * 10/1991 Link ........................... 82/132
5,163,651 A 11/1992 Matsumoto

FOREIGN PATENT DOCUMENTS

| DE | 31 00 141 | 11/1981 | |
|---|---|---|---|
| DE | 3320655 | * 12/1984 | .................. 82/117 |
| DE | 41 07 881 | 9/1991 | |
| EP | 0 788 861 | 8/1997 | |
| WO | WO 99/08832 | 2/1999 | |

* cited by examiner

Primary Examiner—Willmon Fridie, Jr.
(74) Attorney, Agent, or Firm—Barry R. Lipsitz; Douglas M. McAllister

(57) ABSTRACT

The present invention provides an improved machine tool, comprising a machine frame, a support arranged on the machine frame and having a first receiving means for the workpiece or the tool. A cross slide system is arranged on the machine frame and has a second receiving means for the tool or the workpiece which can be moved by the cross slide system in a movement zone of a cross slide movement surface. The cross slide system may comprise two slide elements, one of which is supported on the machine frame and the other bears the second receiving means, such that the slide elements are guided so as to be movable on one another by a single two-dimensional guide means which is movable in the direction of both cross slide movement axes. The guide means determines the precision of the guidance of the second receiving means parallel to the cross slide movement surface. A drive device may be provided, with which the slide element bearing the second receiving means can be moved and fixed in position relative to the other slide element in the two cross slide movement directions with a defined alignment of the slide elements relative to one another.

31 Claims, 8 Drawing Sheets

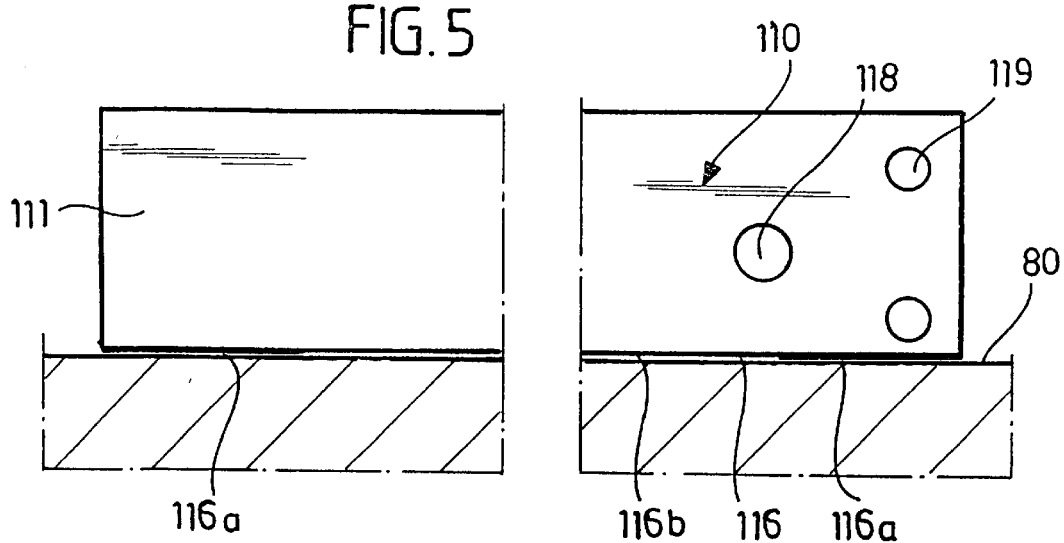
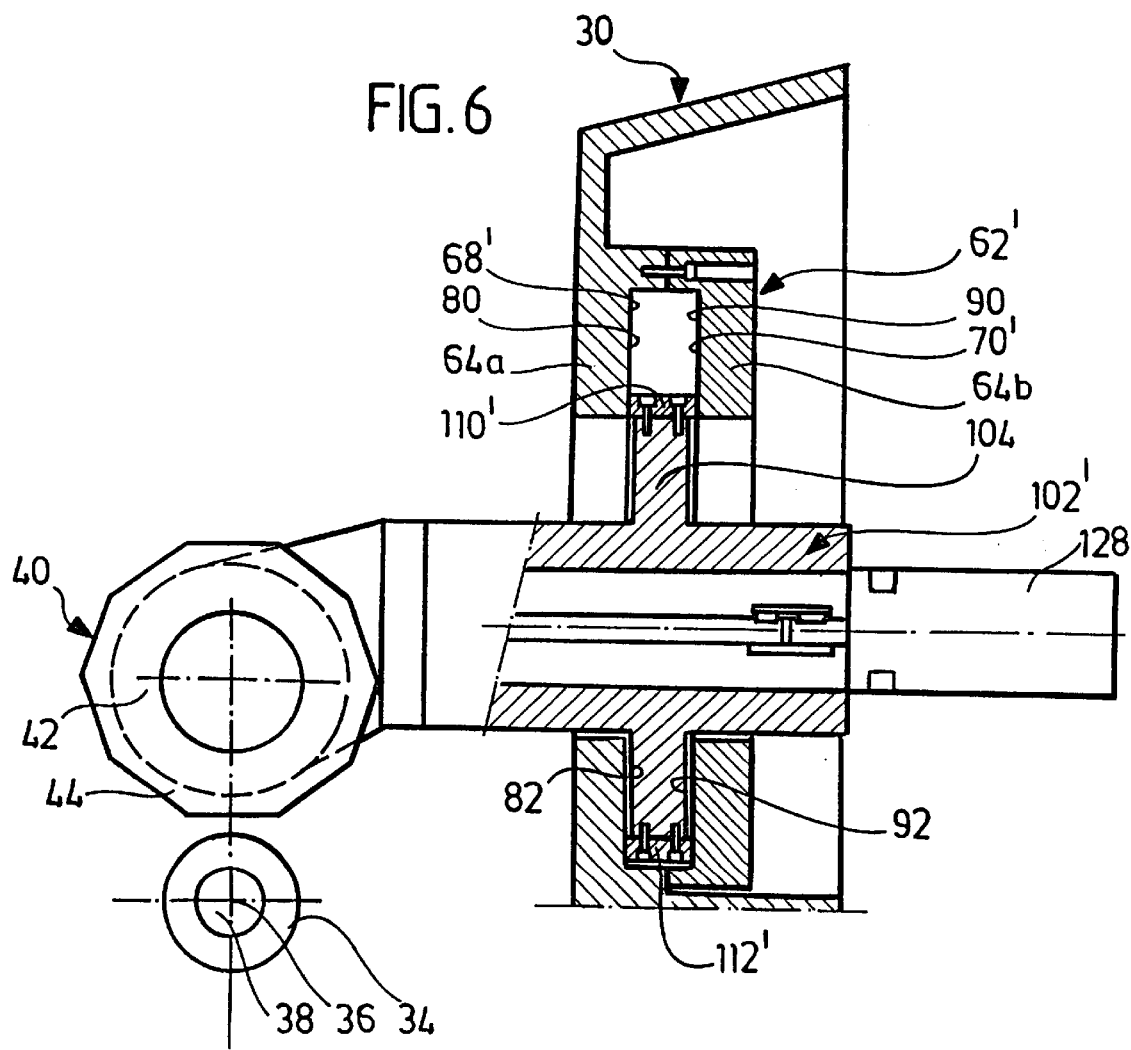

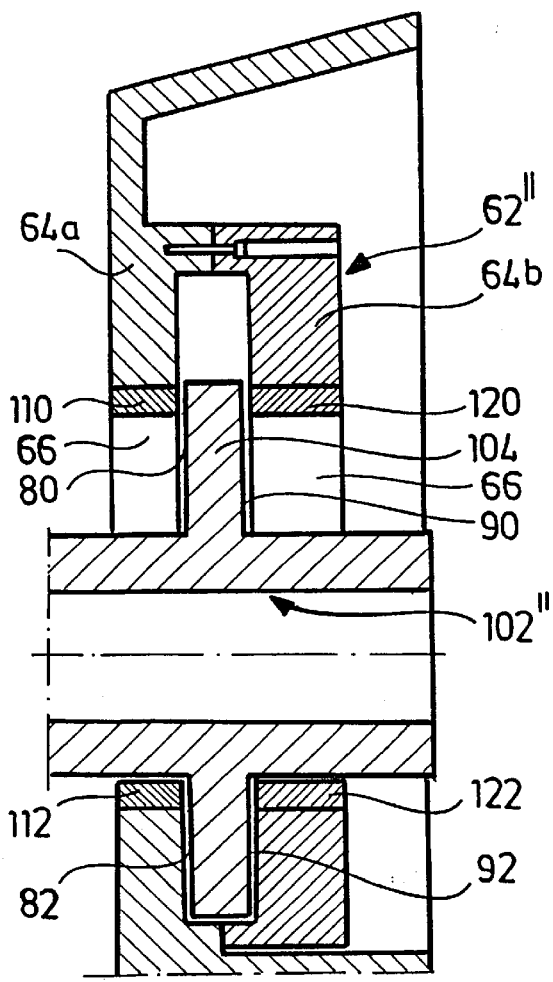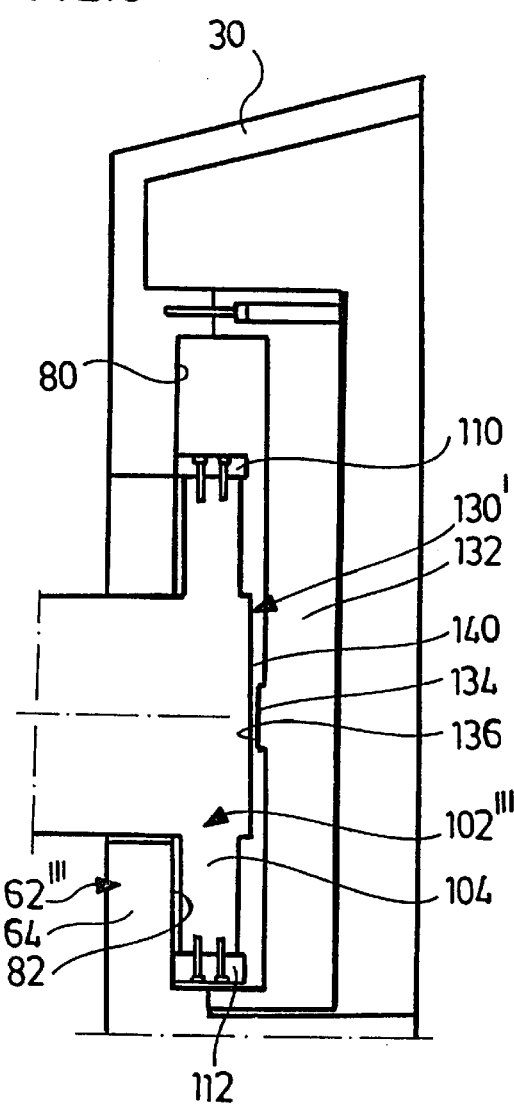

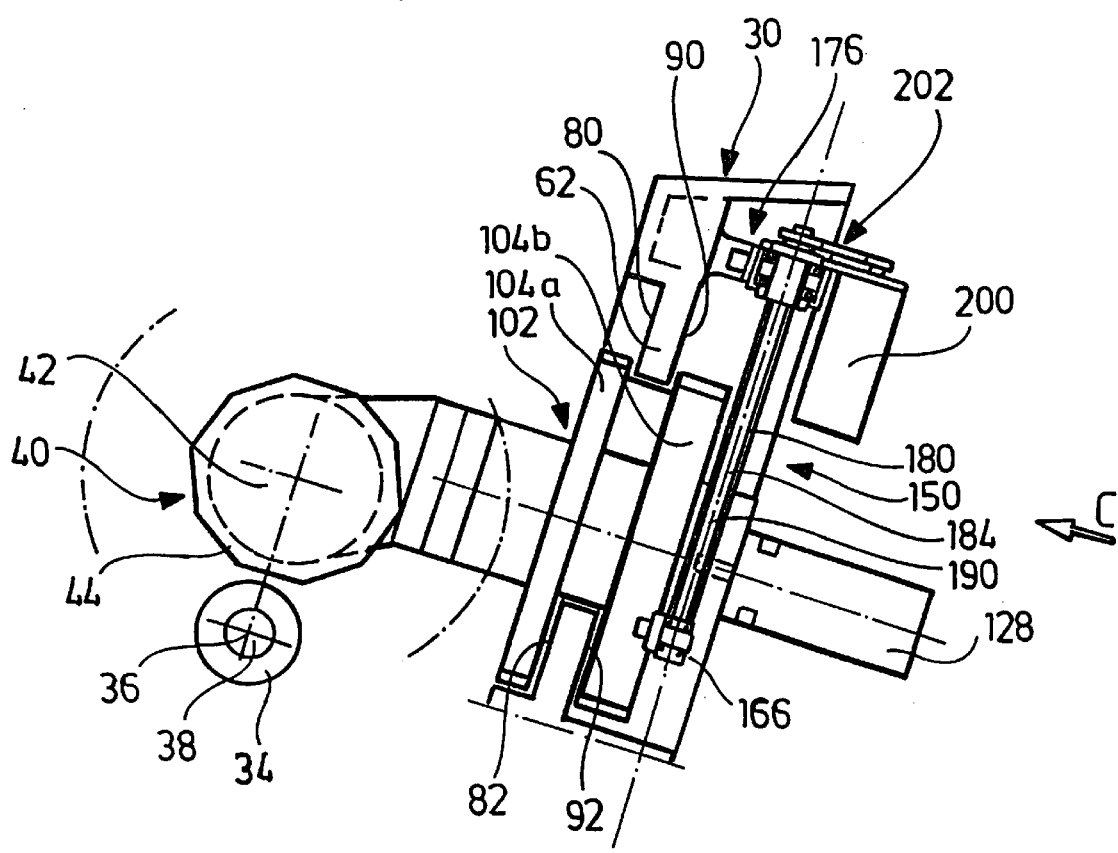

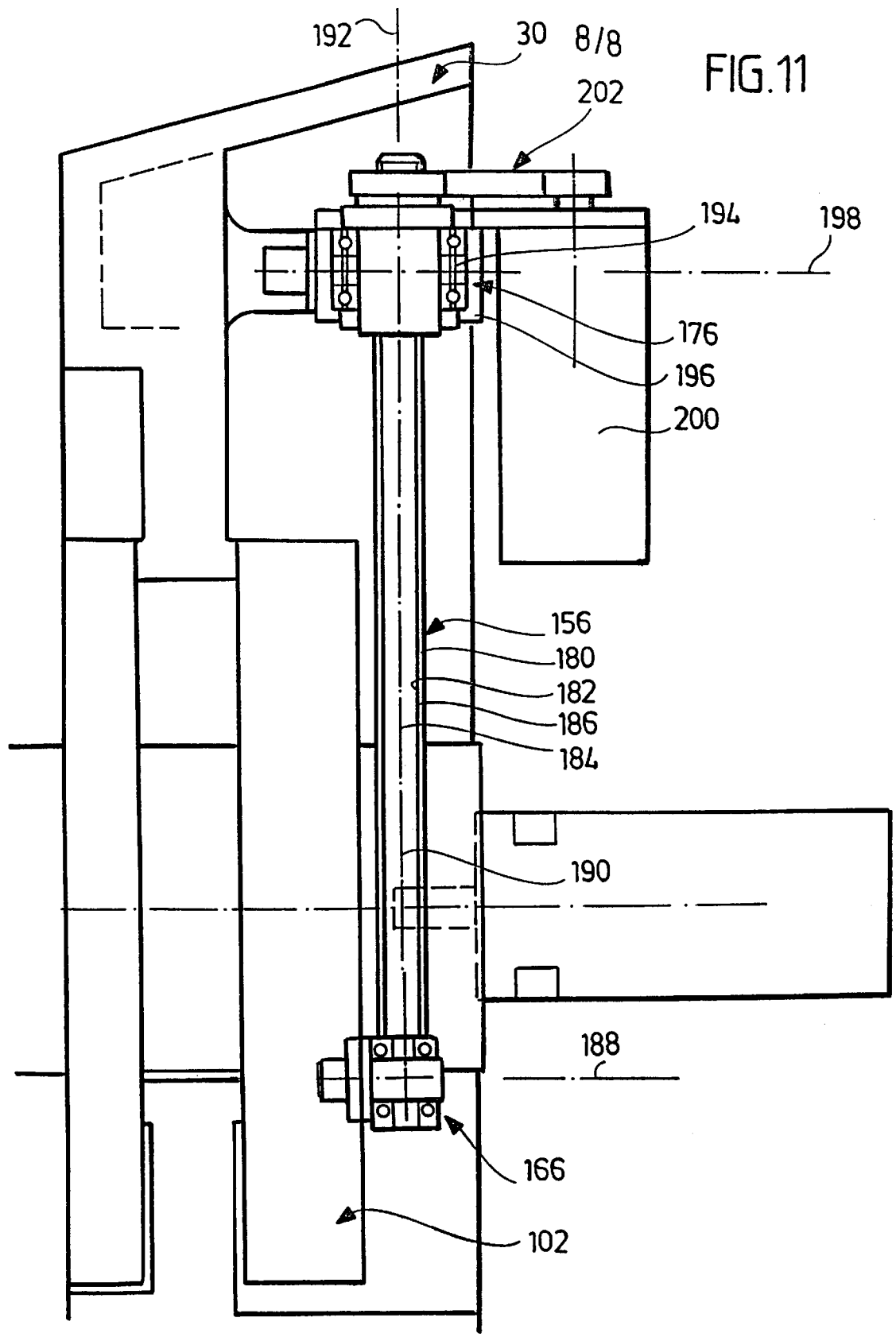

MACHINE TOOL

This application is a continuation of International Application No. PCT/EP01/02675 (WO 01/81040) of Mar. 9, 2001, which is incorporated herein by reference in its entirety and for all purposes.

BACKGROUND OF THE INVENTION

The invention relates to a machine tool for the machining of a workpiece by way of a relative movement between the workpiece and a tool, comprising a machine frame, a support arranged on the machine frame and having a first receiving means for the workpiece or the tool, a cross slide system arranged on the machine frame and having a second receiving means for the tool or the workpiece. The second receiving means which can be moved by the cross slide system relative to the first receiving means in the direction of two cross slide movement axes extending transversely to one another in a movement zone of a cross slide movement surface determined by maximum paths in these cross slide movement directions.

Machine tools of this type are known from the state of the art. In these cases, the cross slide system is constructed such that it has a first slide, which can be moved only in a first cross slide movement direction and can be driven by a drive, and a second slide which is arranged on the first slide and is guided and can be driven only in the direction of a second cross slide movement direction.

With such cross slide systems, large masses are, on the one hand, to be moved so that either the speeds which can be achieved must be low or the drive power high and, on the other hand, inaccuracies in the guidance and any guidance play present are added together, which results in an impairment of the precision of the movement of the second receiving means relative to the first.

The object underlying the invention is therefore to improve a machine tool of the generic type with respect to the characteristics of the cross slide system.

SUMMARY OF THE INVENTION

This object is accomplished in accordance with the invention, in a machine tool of the type described above, in that the cross slide system comprises two slide elements. One of the slide elements is supported on the machine frame and the other slide element bears the second receiving means. The slide elements are guided so as to be movable on one another by a single two-dimensional guide means movable in the direction of both cross slide movement axes. This guide means determines the precision of the guidance of the second receiving means parallel to the cross slide movement surface. A drive device is provided, which enables the slide element bearing the second receiving means to be moved and fixed in position relative to the other slide element in the two cross slide movement directions with a defined alignment of the slide elements relative to one another.

The advantage of the inventive solution is that, as a result of providing a single two-dimensional guide means, the problems with respect to precision and play are reduced and, moreover, the masses to be moved can be reduced since it is no longer necessary to also move guide means and drive for the second moved slide on the first moved slide.

Furthermore, a sufficiently large base for the guide means of the second receiving means in relation to the machine frame and thus a large guidance rigidity can be achieved with the inventive solution in a simple manner.

A two-dimensional guide means of this type may be realized in a particularly simple manner when a first one of the slide elements has at least one guide surface extending parallel to the cross slide movement surface and when a second one of the slide elements is supported on this guide surface with at least one supporting element.

In this respect, it is particularly expedient when the guide surface has an areal (surface) extension in the direction of the cross slide movement directions which corresponds at least to the surface extension of the movement zone.

As a result of such a guide surface, which can, for example, be machined as a flat surface with the highest precision, the precision of the two-dimensional guide means can be achieved in a simple manner.

In order to ensure as stable a support as possible of the slide element bearing the second receiving means, it is preferably provided for the first slide element to have two guide surfaces arranged at a distance from one another.

With respect to the surface extension of the area of the guide surface which is acted upon with a force during the guidance of the slide element bearing the second receiving means, many embodiments are conceivable. In principle, it would be conceivable to allow the surface extension of the area acted upon with a force to vary, for example, dependent on the relative position of the slide elements in relation to one another.

However, since the precision of guidance of the slide elements could be impaired as a result, it is particularly advantageous when the surface extension of the area of the guide surface acted upon with a force is approximately the same size in all the positions of the slide elements relative to one another.

The surface extension of the area of the guide surface acted upon with a force may be kept constant in a particularly simple manner when this is predetermined by the design of the supporting element and when the surface extension of the guide surface is of such a size that in all the positions of the slide elements relative to one another the supporting element acts on the guide surface with the predetermined surface extension.

When several supporting elements are used, there is the problem of the alignment of the several supporting elements relative to one another and relative to the guide surface.

For this purpose, it is provided in one advantageous embodiment for at least one of the supporting elements to be adjustable relative to the second slide element.

A constructionally preferred solution provides for the supporting element to be designed as a supporting bar.

The guidance of the second slide element on the first slide element having the guide surface may be brought about in a variety of ways. For example, it would be conceivable to provide the second slide element with a guide surface and roller members resting thereon as supporting element so that the roller members, with which the guide surfaces are supported on one another, act between the two guide surfaces, wherein the roller members can roll along the guide surfaces in both cross slide movement directions.

In an alternative example embodiment, the at least one guide surface extending parallel to the cross slide movement surface may be designed as at least one sliding surface and the second slide element may be guided by at least one sliding support surface of the supporting element resting on the at least one sliding surface so as to be non-tiltable relative to the cross slide movement surface but displaceable therein two-dimensionally.

The advantage of this solution is that the necessity of providing roller members is dispensed with and large forces acting on the guide surface can also be absorbed in a simple manner. Moreover, the sliding guidance has the advantage of a considerable attenuation.

In order to keep the area of the sliding surface acted upon with a force the same size, in particular, in the case of a sliding surface as guide surface and a support surface acting on this sliding surface, it is preferably provided for the sliding support surface to have a smaller surface extension than the sliding surface and for the sliding support surface to rest on the sliding surface over its entire area in each position of the slide elements relative to one another.

The support surface may be held on an adjustable supporting element so that a precise adjustment of the guidance at the sliding surface is possible with this adjustable supporting element, in particular, when several support surfaces are provided.

A particularly favorable solution with respect to the support for the second receiving means provides for the supporting element to be arranged on the slide element bearing the second receiving means. This solution has the advantage that the supporting element is always arranged at a constant distance from the second receiving means in all the positions of the slide element bearing the second receiving means. Therefore the slide element bearing the second receiving means is always supported on the slide element supported on the machine frame via the supporting elements and thus the slide element is always in the same geometrical relation to the second receiving means, irrespective of the positions of the slide elements relative to one another. In contrast, for example, with the case of a cross slide system, constructed from two linear guide means, the support of the receiving means borne by the cross slide system relative to the linear guide means supported on the machine frame varies in that the second receiving means can be brought into various positions along the additional linear guide means extending transversely thereto.

This advantage of the inventive solution leads to an increase in the precision of the machining of the machine tool since the deformations which are possible due to the geometrical arrangement of the second receiving means relative to the supporting elements are independent of the position of the slide elements relative to one another.

Within the scope of the preceding explanations concerning the inventive solution, it has not been specified in more detail how the cross slide movement surface is intended to be aligned relative to the axes required for the machining of the machine tool.

In theory, it would be possible to arrange the cross slide movement surface parallel to X and Y axes of the machine tool.

One particularly favorable solution does, however, provide for the cross slide movement surface to extend parallel to a plane of movement defined by the X axis and the Z axis of the machine tool.

This solution has the advantage that inaccuracies in the guidance of the slide elements relative to one another in the cross slide movement surface have only an insignificant effect on the precision of the machining since they cause only a movement of the slide element bearing the second receiving means transversely to the plane of movement and, therefore, have no direct influence on the position in the plane of movement. As a result, the positioning in the plane of movement is defined exclusively by the drive device and, therefore, the control.

As a result, the precision of the machine tool may be determined, in particular, in the case of drive devices controlled by the machine control, essentially by the positions predeterminable by the control and the precision is not appreciably influenced in any negative way by guidance inaccuracies.

A further advantageous solution provides for guide surfaces of the slide element supported on the machine frame to be located on both sides of an opening, through which a base member of the slide element bearing the second receiving means passes. As a result, a particularly simple construction is possible, with which access to the second receiving means can be realized in a simple way from a side of the slide element bearing the second receiving means facing away from this receiving means.

A particularly favorable solution provides, for example, for a drive for the second receiving means to be located on a side, which is located opposite the second receiving means, of the base member, which passes through the opening, of the slide element bearing the second receiving means.

When the second receiving means is designed as a tool turret, such a drive may, for example, serve to drive the tool turret for carrying out indexing movements.

It is, however, also conceivable for a drive for the second receiving means to serve to drive tools arranged in the second receiving means themselves.

With respect to the design of the machine tool, it has merely been ascertained thus far that a workpiece can be arranged in one of the receiving means and a tool in the other receiving means.

In this respect, it would, for example, be conceivable for a workpiece held stationarily in the one receiving means to be machined by a rotating tool held in the other receiving means.

In this case, the receiving means is merely a so-called clamping means for the workpiece, relative to which the rotating tool is moved.

A particularly favorable solution does, however, provide for the one receiving means to be designed as a workpiece spindle and the other receiving means as a tool carrier. In this case, it is possible to carry out so-called classical lathe machinings, with which the workpiece is caused to rotate by the workpiece spindle.

The tools may be either classical stationary lathe tools or also rotatingly driven tools.

In addition, it is also possible with a workpiece spindle of this type to carry out machinings of the workpiece by turning the workpiece by means of a C axis movement controlled by a machine control.

In the case of a receiving means designed as a workpiece spindle it is particularly advantageous when the cross slide movement surface extends parallel to a spindle axis of the receiving means designed as a workpiece spindle and parallel to a direction transverse to the spindle axis.

In this case, the inaccuracies of the guidance of the slide elements relative to one another in the cross slide movement surface have an effect on the precision of the machining which is especially insignificant since they lead only to an insignificant or negligible change in the distance between workpiece and spindle axis whereas the positioning of workpiece and tool carrier relative to one another in the plane of movement can be predetermined exactly by the drive device.

In order to ensure that the supporting element always remains in contact with the guide surface and does not lift away from it, a holding down device is provided in one advantageous inventive solution and this device holds the at least one supporting element so as to abut on the at least one guide surface.

The holding down device may, in this respect, be designed in the most varied of ways. For example, it is possible to design the holding down device such that it always keeps the supporting element in contact with the guide surface with a force.

This force may be brought about, for example, by a device generating a pressure force which can be designed, for example, as a hydrostatic sliding bearing or also as a drive acting upon the supporting element in the direction of the guide surface.

A solution advantageously benefitting the guide properties of the two-dimensional guide means provides for the holding down device to have at least one additional guide surface, which extends parallel to the cross slide movement surface. The surface extension of the additional guide surface in the direction of the cross slide movement directions corresponds at least to the surface extension of the movement zone, and has an additional supporting element which acts on the guide surface.

In principle, the additional guide surface and the additional supporting element may be arranged optionally on the slide elements. It is, however, particularly advantageous from a constructional point of view when the additional guide surface is arranged on the first slide element and the additional supporting element on the second slide element.

In this respect, it is particularly favorable when the first slide element is provided with the guide surface on one side and with the additional guide surface on the opposite side.

An alternative solution provides for the guide surface and the additional guide surface to be arranged on a base member of the first slide elements so as to face one another.

In this respect, in the cases where the guide surface and the additional guide surface are arranged on the first slide element, the supporting element and the additional supporting element are preferably arranged on the second slide element.

With respect to the arrangement of the drive device relative to the slide elements and the second receiving means, no further details have so far been given.

One particularly favorable solution provides for the drive device to engage on a side of the slide element bearing the second receiving means which is located opposite the second receiving means.

As a result, it is possible to arrange the drive device such that it is located outside a working space, in which the second receiving means is arranged for the positioning of the workpiece or tool.

As a result, it is possible, in particular, in the case of a metal-cutting machining to provide the drive device outside the working space which is subjected to dirt contamination.

It is also particularly expedient when the drive device is arranged on a side of the slide element supported on the machine frame which is located opposite the second receiving means, so that the drive device is, as a result, located completely outside the working space.

Another favorable solution provides for the drive device to be arranged on a side of a machine base member located opposite the second receiving means, with the slide element supported on the machine frame being fixed on this base member, so that the entire drive device can be advantageously arranged automatically by means of the entire machine base member and the slide elements supported on it. Therefore, the provision of complicated covers for the protection of the drive device itself is superfluous and, consequently, covers are provided only for the protection of the areas over which the slide elements slide relative to one another.

With respect to the drive device for the slide element bearing the second receiving means, no further details have been given in conjunction with the preceding explanations concerning the individual embodiments. It is, however, necessary within the meaning of the inventive solution for the drive device to determine not only a definite position of the slide elements relative to one another but also a definite alignment of the slide elements relative to one another.

Particularly when it is of significance for the second receiving means to be positioned in a suitable rotary alignment in relation to the first receiving means, it is advantageous when the drive device is designed such that it always moves the slide elements in the same alignment relative to one another. In other words, the slide elements can be moved two-dimensionally relative to one another but the alignment of the slide elements relative to one another, once achieved, is maintained in all the positions during the two-dimensional movement.

This may be achieved, in principle, by a corresponding activation of the drive device during the movement of the slide element when the drive device is designed such that it allows all possible movements of the slide element.

This may be realized particularly favorably when the drive device forms an at least partial mechanical parallel guide means for the slide elements.

In principle, it would be conceivable to design the drive device as a conventional, two-dimensional drive device, i.e. with two one-dimensional drives each operative in one of the cross slide movement directions.

One particularly favorable solution does, however, provide for the drive device to engage on the slide element bearing the second receiving means at at least two points of engagement arranged at a distance from one another with three drive arms which extend in at least two different directions. The drive device can be activated by a machine control and have an articulated head. The points of engagement may be positionable in a defined manner relative to the first slide element by means of the three drive arms.

Such a solution has the great advantage that with it the masses to be moved may be reduced to a considerable degree on account of the drive device.

In this respect, it is preferably provided for each of the drive arms to be articulatedly mounted in a pivot bearing relative to the other slide element. A linear drive may be associated with each of the drive arms.

In this respect, it is possible to design the drive arms to be invariant in length and to move the pivot bearings by means of the linear drives so that the movement of each pivot bearing is transferred to the point of engagement on the slide element bearing the second receiving means by means of the drive arms of invariant length.

Alternatively thereto, one particularly favorable solution provides for the pivot bearings to be arranged so as to be stationary relative to the other slide element and for the drive arms to be designed so as to be variable in length by means of the associated linear drive.

Such a design of a drive arm variable in length may be realized in a particularly simple manner when the drive arm can be adjusted by means of a spindle drive to be variable in length.

A particularly favorable solution provides for a drive motor for the linear drive to be arranged in the region of the pivot bearing so that this drive motor need not also be moved relative to the pivot bearing but rather need only be co-rotated about the pivot bearing. In this manner, a considerable reduction in the forces of inertia which occur can be achieved.

A particularly favorable guidance of the slide element bearing the second receiving means may be achieved when two of the drive arms form a parallel guide means.

Such a formation of a parallel guide means by way of two drive arms may be achieved either with drive arms which are invariant in length in that their pivot bearings are moved parallel to one direction either by a linear movement device or by two synchronized linear movement devices.

In the case of drive arms which are variable in length, another solution provides for the two drive arms to be synchronously adjustable in length by way of the machine control.

For example, this may be achieved via a control which activates the drive motors for the length adjustment in such a manner that both drive arms always have the same length.

Additional features of the invention are the subject matter of the following detailed description as well as the drawings illustrating several embodiments.

BRIEF DESCRIPTION OF THE DRAWINGS

FIG. 5 shows an illustration of a variation of the first embodiment in accordance with FIG. 4;

FIG. 6 shows an illustration similar to FIG. 3 of a second embodiment of an inventive machine tool;

FIG. 7 shows an illustration similar to FIG. 3 of a third embodiment of an inventive machine tool;

FIG. 8 shows an illustration similar to FIG. 3 of a fourth embodiment of an inventive machine tool;

FIG. 9 shows an illustration of the first embodiment in accordance with FIG. 3 with an inventive drive device;

FIG. 11 shows a section along line 11—11 in FIG. 10.

DETAILED DESCRIPTION OF THE INVENTION

Figure 1:
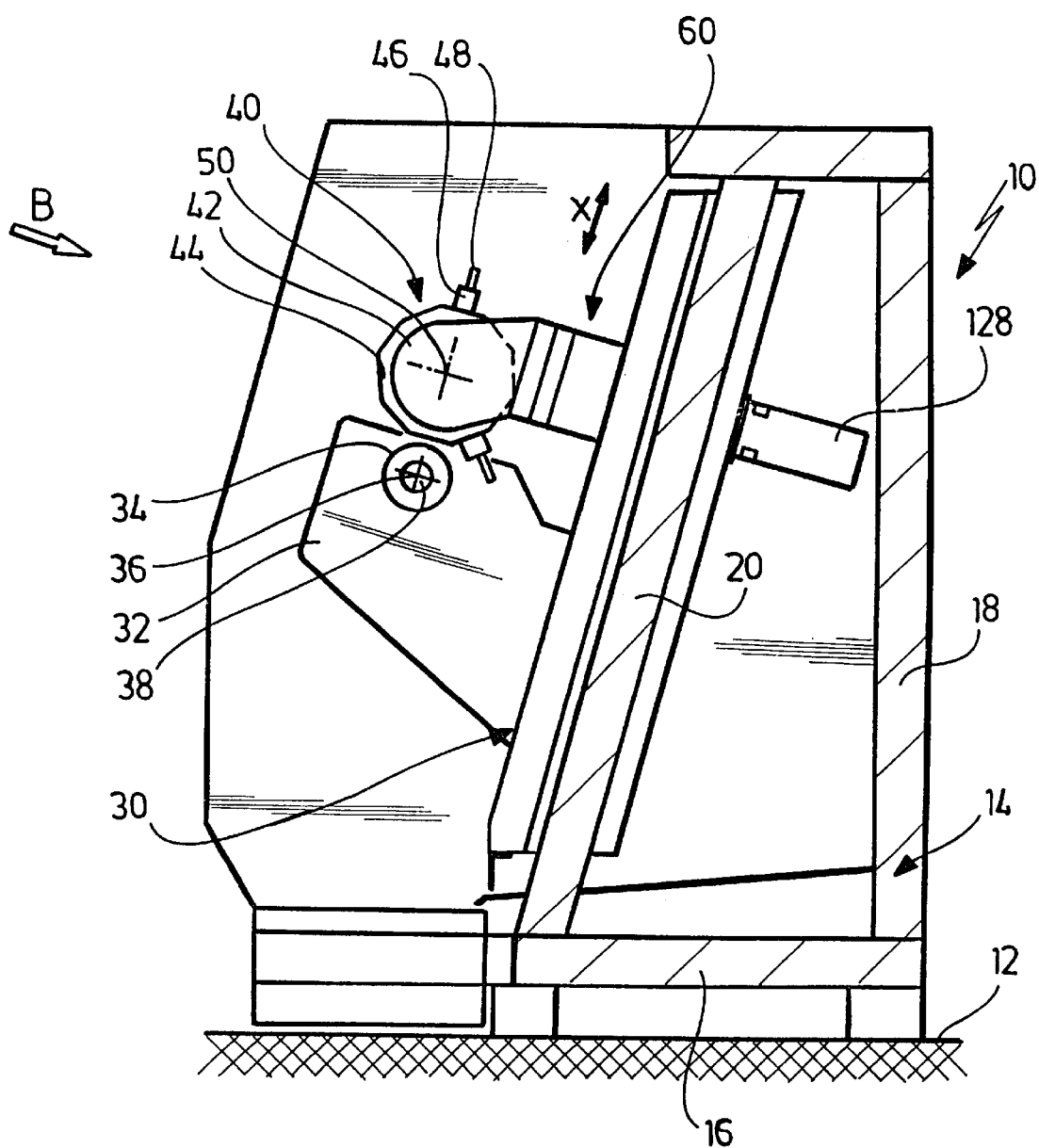
FIG. 1 shows a side view of a first embodiment of an inventive machine tool in the direction of arrow A in FIG. 2.

One embodiment of an inventive machine tool, illustrated in FIG. 1, comprises a machine frame which is designated as a whole as 10 and is provided with a frame 14 which is seated on a base surface 12. Base supports 16 extend approximately parallel to the base surface 12. Supports 18 extend transversely to the base surface 12. Bed supports 20 extend at an angle to the base surface 12.

A machine base member designated as a whole as 30 is held on the bed supports 20 of the frame 14 and is preferably designed similar to a plate.

A headstock 32 is seated on this machine base member 30 and, in the case of a lathe, a workpiece spindle 34 is mounted in this headstock for rotation about a spindle axis 36.

For the machining of a workpiece 38 accommodated in the workpiece spindle 34 representing a first receiving means, a tool carrier designated as a whole as 40 and representing a second receiving means is provided. The tool carrier 40 is designed, for example, as a turret and has a turret head 44 which is mounted on a turret housing 42 so as to be rotatable and on which tool holders 46 with machining tools 48 are mounted. By turning the turret head 44 about a turret axis 50 different tools 48 can be brought into use on the workpiece 38.

The entire tool carrier 40 is held by a cross slide system which is designated as a whole as 60 and with which the tool carrier 40 can be moved in the direction of a Z axis parallel to the spindle axis 36 and in the direction of an X axis transversely to the spindle axis 36, preferably at right angles to it.

Figure 2:
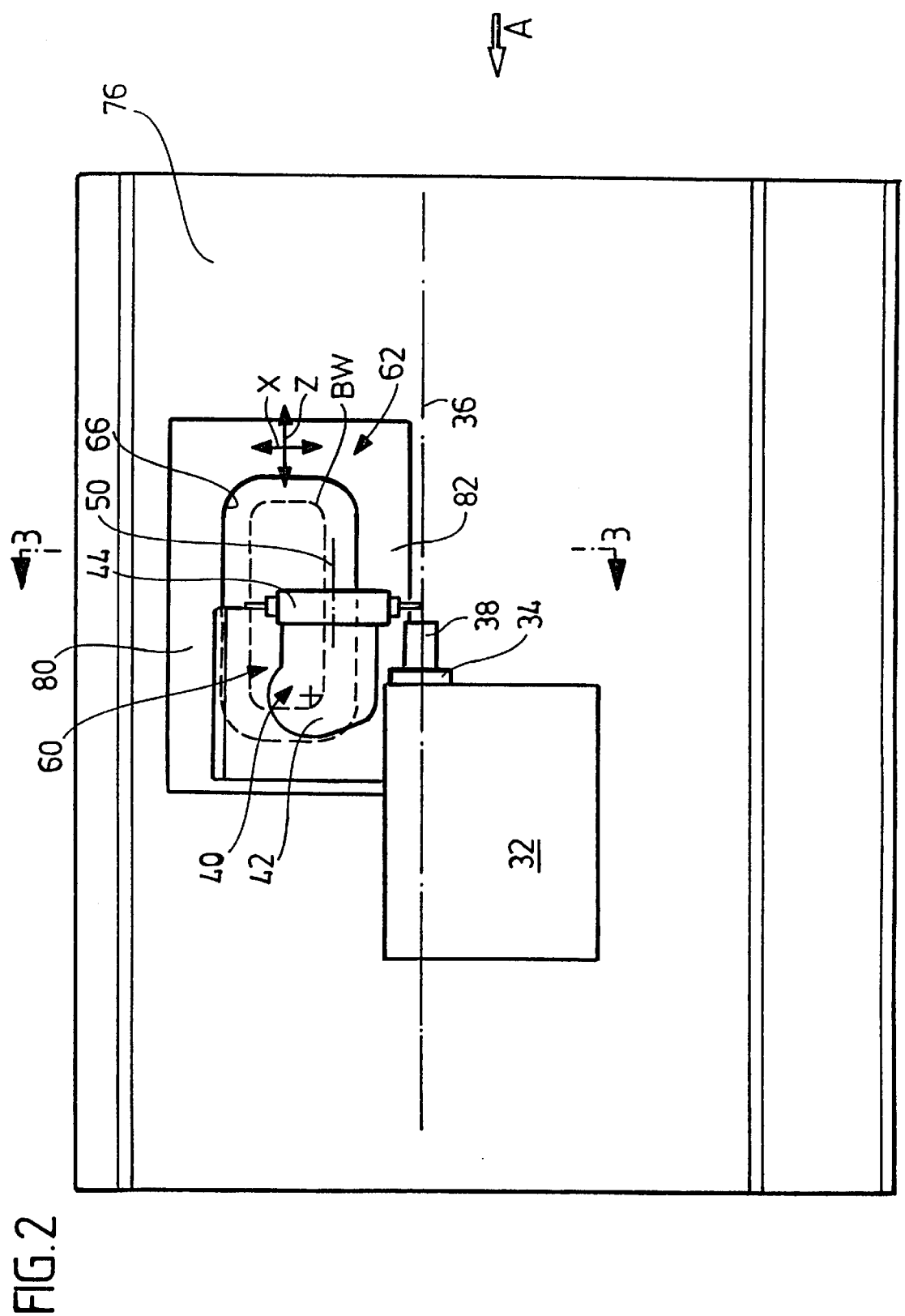
FIG. 2 shows a view of the first embodiment in the direction of the arrow in FIG. 1.
Figure 3:
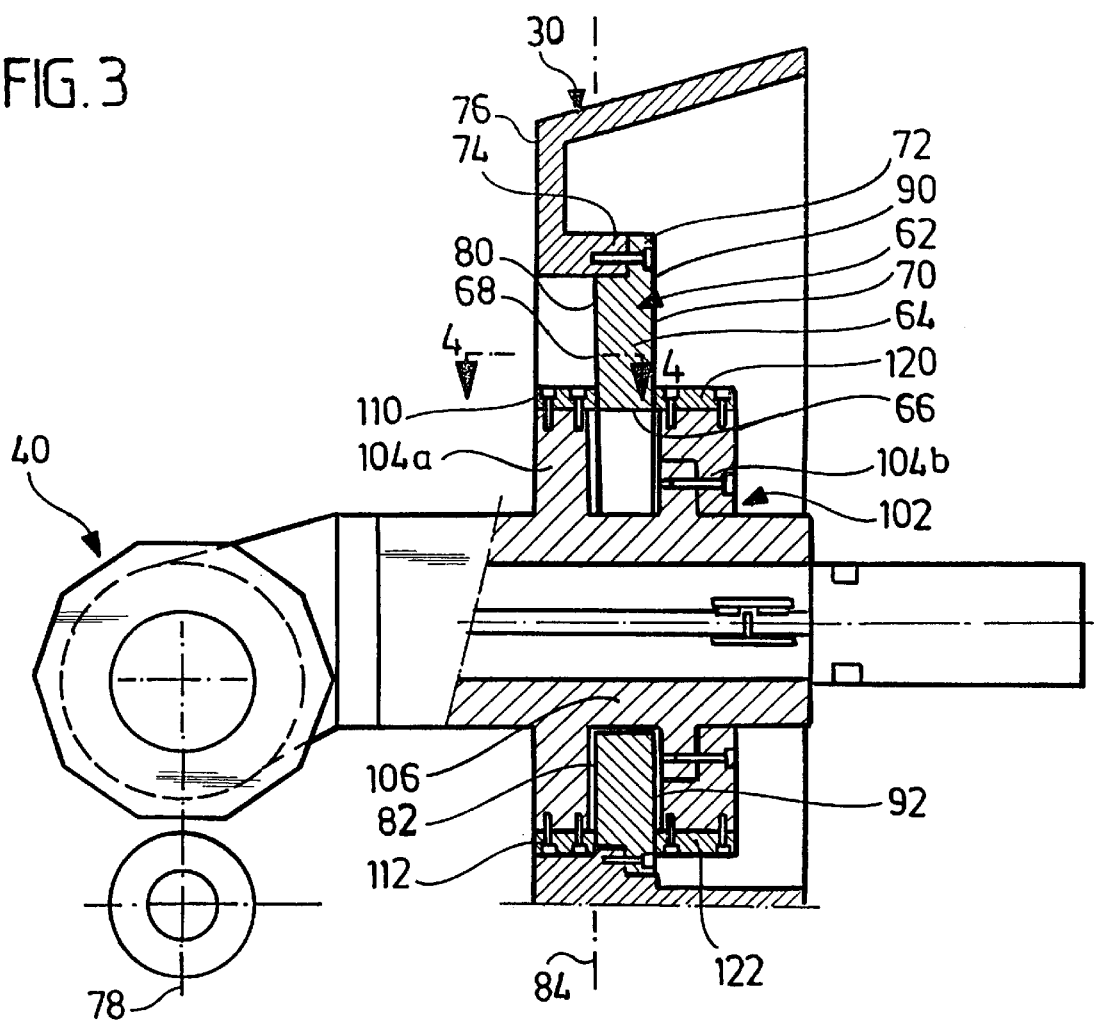
FIG. 3 shows a section along line 3—3 in FIG. 2 without illustration of a drive device.

The cross slide system 60 comprises, as illustrated in FIGS. 2 and 3, a slide element 62 on the machine base side which is designed in the form of a plate 64 with an opening 66 in the central area thereof and has surfaces 68 and 70 extending essentially parallel to one another around the opening 66.

The plate 64 is fixed, for example, with its outer edge 72 on a holding bead 74 of the machine base member 30, such that the surface 68 is set back in relation to a surface 76 of the machine base member 30.

The first slide element 62 forms sliding surfaces 80 and 82 which are located on opposite sides of the opening 66. Sliding surfaces 80 and 82 preferably extend in the direction of one axis, for example, in the direction of the Z axis and both surfaces extend parallel to a cross slide movement surface 84 which is aligned parallel to a plane of machining 78 which is defined by the X axis and the Z axis and extends, for example, through the spindle axis 36.

This cross slide movement surface 84 defines the alignment of the tool carrier 40 in all the positions thereof in the direction of the X axis and the Z axis relative to the machine base member 30.

In the simplest case, the sliding surfaces 80 and 82 are sections of the surface 68 of the plate 64 which is machined altogether as a flat surfaceIt is, however, also conceivable to design the sliding surfaces 80 and 82 to be exactly parallel to the cross slide movement surface 84 by way of an additional precision machining and, in addition, for the requirements to be met by the surface 68 of the plate 64 to be less.

Furthermore, the plate 64 is provided on its side located opposite the sliding surfaces 80 and 82 with sliding surfaces 90 and 92 which are located on opposite sides of the opening 66. In the simplest case, sliding surfaces 90 and 92 have the same extension as the sliding surfaces 80 and 82 and are arranged so as to be congruent with the sliding surfaces 80 and 82.

The sliding surfaces 90 and 92 also extend parallel to the cross slide movement surface 84 and may, in the simplest case, be sections of the surface 70 of the plate 64. It is, however, conceivable, in the same way as in the case of the sliding surfaces 80 and 82, to design the sliding surfaces 90 and 92 as separate areas aligned parallel to the cross slide movement surface 84 by way of precision machining.

The slide element 62 on the machine base side guides a slide element on the tool carrier side which is designated as a whole as 102. The slide element 102 has an upper guide member 104a engaging over the sliding surfaces 80 and 82 at least partially and a lower guide member 104b engaging over the sliding surfaces 90 and 92 at least partially as well as a base member 106 which passes through the opening 66 and connects the two guide members 104*a* and 104*b* to one another.

The guide member 104*a* bears supporting rails 110 and 112 which rest on the sliding surfaces 80 and 82 in all the positions of the slide element 102 on the tool carrier side in order to guide the slide element 102 on the tool carrier side in a precise alignment in relation to the cross slide movement surface 84.

Furthermore, the guide member 104*b* is provided with supporting rails 120 and 122 which rest on the sliding surfaces 90 and 92 in all the positions of the slide element 102 on the tool carrier side and, therefore, guide the slide element 102 on the tool carrier side in a defined alignment in relation to the cross slide movement surface 84.

As illustrated in FIG. 2, the sliding surfaces 80 and 82 preferably have such surface extension in the direction of the cross slide movement directions X and Z and thus parallel to the cross slide movement surface 84 that the supporting rails 110 and 112 can rest fully supported on the sliding surfaces 80 and 82 in all the relative positions of the slide element 102 on the tool carrier side relative to the slide element 62 on the machine base side which are located within a movement zone BW determined by the maximum paths in the direction of the X axis and the Z axis.

The supporting rails thereby form, as illustrated with the example of the supporting rail 110, a sliding support surface 116 which extends over their entire extension in their longitudinal direction 114 and rests on the corresponding sliding surface (i.e., in this case the sliding surface 80 over its entire extension in the longitudinal direction 114).

In order to be able to achieve as uniform a contact of the sliding support surface 116 on the sliding surface 80 as possible, the supporting rail 110 is preferably held on the guide member 104*a* so as to be adjustable, eccentric screws are provided, for example, as adjusting means 118 and, in addition, holding screws 119 as fixing means, the advancing of the supporting rail 110 towards the sliding surface 80 can be adjusted by means of the eccentric screws 118 once the holding screws 119 have been released subsequently, fixing of the supporting rail 110 in position is brought about by means of the holding screws 119.

In a variation of the first embodiment, illustrated in FIG. 5, the supporting rail 110 is designed such that its sliding support surface 116 supports only in sections 116*a* thereof, for example, outer sections such that in a central area 116*b* the sliding support surface 116 moves over the sliding surface 80 at a slight, nonsupporting distance so that the guidance of the supporting rail 110 by the sliding surface 80 is essentially brought about only by the supporting sections 116*a* of the sliding support surface 116.

Furthermore, a drive motor 128 is provided on a side of the base member 106 located opposite the turret housing 42 for driving drivable tools of the tool carrier 40 and, for example, also for driving the turret head 44 relative to the turret housing 42. The drive motor is thus arranged on the side of the machine base member 30 located opposite the workpiece spindle 34 and the tool carrier 40.

It is also possible as a result of the inventive solution to supply any type of line, for example, for energy to the second receiving means 40 from a side facing away from the working space.

Such a design of the supporting rail 110' allows an even more precise advancing thereof with respect to the sliding surface 80.

In a second embodiment of an inventive machine tool, as illustrated in FIG. 6, the slide element 62' on the machine base side is designed such that it has two plates 64*a* and 64*b* which extend parallel to one another and bear the sliding surfaces 80 and 82 or 90 and 92 on their facing surfaces 68' and 70'.

In this case, the slide element 102' on the tool carrier side is merely provided with one guide member 104 which extends in between the plates 64*a* and 64*b* so that the supporting rails 110 and 112 are respectively guided between the sliding surfaces 80 and 90 or 82 and 92 and are thus guided on both sides thereof.

In a third embodiment, illustrated in FIG. 7, the slide element 62" on the machine base side comprises, in the same way as in the second embodiment, the two plates 64*a* and 64*b* which do not, however, bear the sliding surfaces 80 and 82 as well as 90 and 92. Rather in the illustrated embodiment, the plate 64*a* bears the supporting rails 110 and 112 on opposite sides of the opening 66 and the plate 64*b* bears the supporting rails 120 and 122 on the sides located opposite the opening 66. Furthermore, the slide element 102" on the tool carrier side is provided in the area of the one guide member 104 extending in between the plates 64*a* and 64*b* with the sliding surfaces 80 and 82 which face the supporting rails 110 and 112, respectively, and on its opposite side with the sliding surfaces 90 and 92 which face the supporting rails 120 and 122 so that the guide member 104 is guided with its sliding surfaces 80 and 90 as well as 82 and 92 between the supporting rails 110 and 120 as well as 112 and 122.

Figure 4:
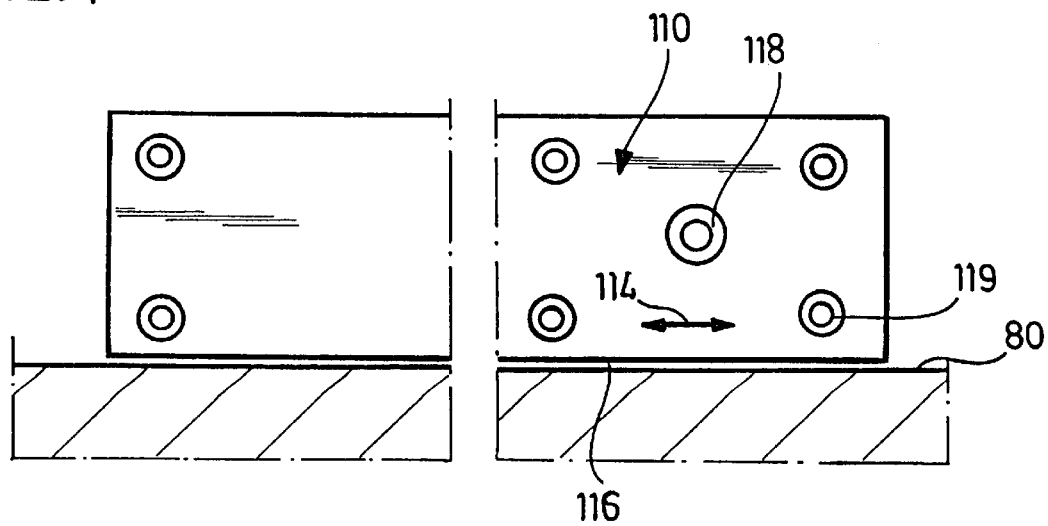
FIG. 4 shows a section along line 4—4 in FIG. 3.

In the second and the third embodiments, the supporting rails can also be supporting with their supporting surfaces either over their entire surfaces or only in sections, as explained in conjunction with the first embodiment with reference to FIGS. 4 and 5.

In the first, second and third embodiments, the defined guidance of the slide element 102 on the tool carrier side is brought about in the direction of the cross slide movement surface 84 by two sets 124, 126 of sliding guide means with sliding surfaces located opposite one another. One set 124 of sliding guide means comprises the sliding surfaces 80 and 82 with the associated supporting rails 110 and 112 or 110' and 112'. The other set 126 of sliding guide means comprises the sliding surfaces 90 and 92 with the associated supporting elements 110 and 112 as well as 110' and 112'. In this respect, one of the sets 124, 126 of sliding guide means forms the actual sliding guide means, and the other one of the sets 126, 124 represents a holding down device 130 which keeps the sliding surfaces and supporting rails of the actual sliding guide means in contact.

In principle, it is, therefore, sufficient to determine a defined orientation of the slide element 102 on the tool carrier side by way of a single set of sliding guide means, for example, the set 124 with the sliding surfaces 80 and 82 and to ensure that these sliding surfaces 80 and 82 and the corresponding supporting rails 110 and 112 are always kept in contact.

This is illustrated in FIG. 8 in the case of the fourth embodiment.

This fourth embodiment according to FIG. 8 represents a modification of the second embodiment according to FIG. 6, wherein the slide element 62' on the machine base side merely has the plate 64 which bears the sliding surfaces 80 and 82, on which the supporting rails 110 and 112, which are held on the supporting member 104 of the slide element 102' on the tool carrier side, are guided.

The sliding surfaces 90 and 92 no longer present in the fourth embodiment are replaced by the holding down device which is designated as a whole as 130. The holding down device 130 has a holding plate 132 which is securely connected to the machine base member 30 and bears a supporting member 134 which, with a sliding support surface 136, is associated with a sliding surface 140 on the slide element 102''' on the tool carrier side. The sliding surface 140 is arranged, for example, between the supporting rails 110 and 112, preferably symmetrically between them, and extends parallel to the sliding surfaces 80 and 82 but is arranged on the slide element 102''' on the tool carrier side so as to face away from them so that the sliding support surface 136 acting upon the sliding surface 140 acts on the slide element 102''' on the tool carrier side such that this is guided with the supporting rails 110 and 112 always in contact with the sliding surfaces 80 and 82 of the slide element 62''' on the machine base side which determine the alignment thereof.

The sliding surface 140 preferably forms with the sliding support surface 136 a hydrostatic sliding bearing, by means of which a force acts on the slide element 102''' on the tool carrier side in such a manner that the supporting rails 110, 112 are kept in contact with the sliding surfaces 80, 82 by being acted upon with a force.

The sliding surface 140 is designed such that in all the positions of the slide element 102' on the tool carrier side the supporting surface 136 rests on it.

In conjunction with the embodiments explained so far, only the type of guidance of the slide element 102 on the tool carrier side on the slide element 62 on the machine base side has been explained but no details have been given as to how a drive of the slide element 102 on the tool carrier side relative to the slide element 62 on the machine base side is intended to be brought about.

Such a drive is explained in connection with FIGS. 9, 10 and 11 on the basis of the first embodiment.

Figure 10:
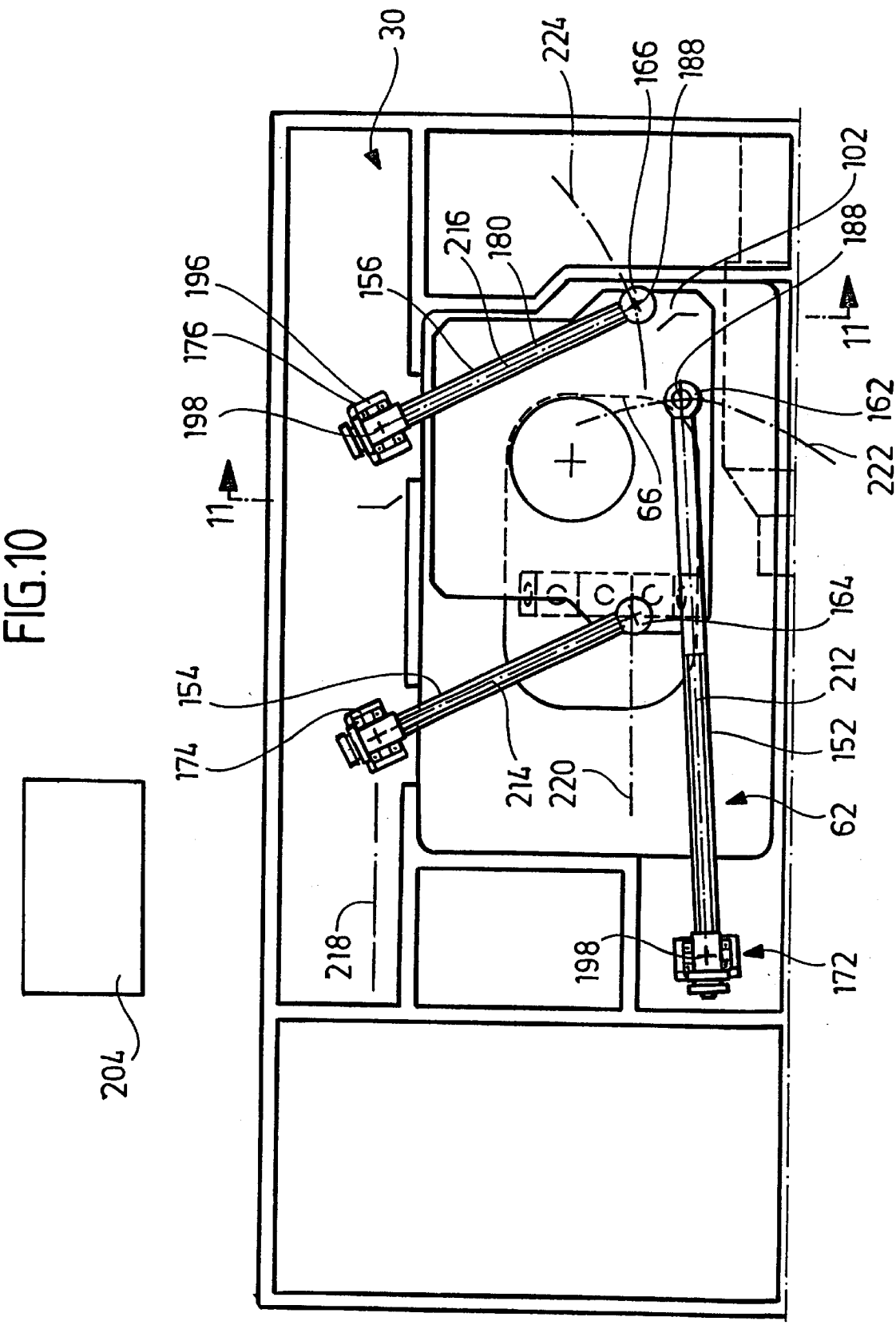
FIG. 10 shows a plan view in the direction of arrow C in FIG. 9.

As illustrated in FIGS. 9 and 10, a drive device designated as a whole as 150 is provided on a side of the machine base member 30 located opposite the tool carrier 40, and the drive device 150 comprises altogether three drive arms 152, 154 and 156. Each of the drive arms 152, 154 and 156 engages with an articulated head 162, 164 and 166 on the slide element 102 on the tool holder side and is mounted with a pivot bearing 172, 174 and 176 so as to be pivotable on the machine base member 30 outside the slide element 62 on the machine base side.

Each of the drive arms 152, 154 and 156 comprises, as illustrated in FIG. 11 with the example of the drive arm 156, an outer tube 180 with an internal thread 182, into which a spindle 184 with an external thread 186 is screwed.

The spindle 184 is non-rotatably held on the articulated head 166, which engages on the slide element 102 on the tool holder side so as to be rotatable only about an axis of rotation 188. The articulated head 166 is therefore rotatable in relation to this slide element only about the axis of rotation 188, wherein the axis of rotation 188 extends at right angles to the cross slide movement surface 84.

Furthermore, the spindle 184 extends with it s spindle axis 190 in a plane of movement 192 which is preferably arranged parallel to the cross slide movement surface 84.

The threaded tube 180 which extends coaxially to the spindle axis 189 preferably extends parallel to the plane of movement 192 and is mounted by a rotary bearing 194 in a pivot housing 196 of the pivot bearing 176, wherein the pivot housing 196 is mounted on the machine base member 30 so as to be rotatable about a pivot axis 198.

Furthermore, a drive 200 is also held on the pivot housing 196 and with it the threaded tube 180 can be driven for rotation via an intermediate gear means 202 in order to configure the drive arm 156 so as to be adjustable in length via the unit consisting of threaded tube 180 and spindle 184. In other words, the distance between the pivot axis 198 rigidly arranged on the machine base member 30 and the axis of rotation 188 rigidly arranged on the pivot element 102 on the tool holder side can be adjusted due to rotation of the threaded tube 180 by means of the drive 200.

The drives 200 of all the drive arms 152, 154, 156 can be activated by a machine control 104 so that the slide element 102 on the tool carrier side can be brought into all the positions relative to the slide element on the machine base side which are located within the movement zone BW.

In order to move the slide element 102 on the tool carrier side relative to the slide element 62 on the machine base side, the drive arms 152, 154 and 156 are arranged such that a longitudinal direction 212, along which the drive arm 152 is adjustable in length, extends transversely to longitudinal directions 214 and 216, along which the drive arms 154 and 156 are adjustable in length, namely in all the positions of the slide element 102 on the tool carrier side relative to the slide element 62 on the machine base side.

Furthermore, the pivot axes 198 of the pivot bearings 174 and 176 are preferably arranged along a line 218 and the axes of rotation 188 on the slide element 102 on the tool holder side along a line 220. The pivot axes 198 of the pivot bearings 174 and 176 preferably have the same distance from one another as the axes of rotation 188 of the articulated heads 164 and 166.

If, in addition, the drives 200 of the drive arms 154 and 156 are activated by the machine control 204 such that they always bring about the same distance between the pivot axis 198 and the axis of rotation 188 synchronously with one another, the two drive arms 154 and 156 form a parallel guide means which sees to it that the line 220 always extends parallel to the line 218.

In this respect, it is particularly advantageous when the line 218 is aligned parallel to the spindle axis 36 and thus parallel to the Z axis.

As a result of such a parallel guide means by means of the drive arms 154 and 156, the slide element 102 on the tool carrier side can always be moved into positions parallel to one another since the line 220 extends parallel to the line 218 in all the possible positions of the slide element 102 on the tool carrier side.

The possible positions of the slide element 102 on the tool carrier side relative to the slide element 62 on the machine base side, which are predetermined, for example, by the size of the opening 66 and are located within the movement zone BW, can be reached in that the lengths of the drive arms 154 and 156 are altered synchronously by the machine control 204 which results primarily in a movement in X direction. This is not a straight-line movement but rather a movement along a curved line 222 which corresponds to an arc of a circle which the axis of rotation 188 of the articulated head 162 describes during its movement about the pivot axis 198 of the pivot bearing 172.

If, therefore, a straight-line movement in X direction is intended to be brought about, the length of the drive arm 152 cannot be kept constant but rather must be altered simultaneously by the machine control 204.

On the other hand, an alternation in the length of the drive arm 152 by the machine control 204 primarily causes a movement in Z direction, wherein the movement takes place along a path 224 when the length of the drive arms 154 and 156 is unaltered, this path corresponding to an arc of a circle which the axis of rotation 188, for example, of the articulated head 166 describes about the pivot axis 198 of the pivot bearing 176. If, therefore, a straight-line movement in the Z direction is intended to take place, the length of the drive arms 154 and 156 is also to be varied by the machine control 204, in addition to the variation of the length of the drive arm 152, the machine control activating all the drives 200 of all the drive arms 152, 154 and 156 in a coordinated manner.

What is claimed is:

1. Machine tool for the machining of a workpiece by way of a relative movement between the workpiece and a tool, comprising:
   a machine frame,
   a support arranged on the machine frame and having a first receiving means for the workpiece or the tool,
   a cross slide system arranged on the machine frame and having a second receiving means for the tool or the workpiece,
   said receiving means being movable by the cross slide system relative to the first receiving means in the direction of two cross slide movement axes extending transversely to one another in a movement zone of a cross slide movement surface determined by maximum paths in these cross slide movement directions,
   the cross slide system comprising two slide elements, one of said slide elements being supported on the machine frame and the other slide element bearing the second receiving means, the slide elements being movable on one another by a single two-dimensional guidance system, said guidance system enabling movement in the direction of both cross slide movement axes, said guidance system comprising at least one guide surface arranged on a first one of the slide elements, said at least one guide surface extending parallel to the cross slide movement surface, and at least one support surface on at least two supporting elements arranged on a second one of the slide elements being supported on said guide surface, said supporting elements being arranged at a distance from each other and acting with said support surface on said guide surface within a supporting area, a surface extension of said supporting area acted upon with a force being approximately of the same size in all the positions of the slide elements relative to one another, said guidance system determining the precision of guidance of the second receiving means parallel to the cross slide movement surface, and
   a drive device, said drive device enabling the slide element bearing the second receiving means to be moved and fixed in position relative to the other slide element in the two cross slide movement directions with a defined alignment of the slide elements relative to one another.

2. Machine tool as defined in claim 1, wherein a surface extension of the guide surface in the direction of the cross slide movement directions corresponds at least to a surface extension of the movement zone.

3. Machine tool as defined in claim 1, wherein the first slide element has two guide surfaces arranged at a distance from one another.

4. Machine tool as defined in claim 1, wherein the surface extension of the area of the guide surface acted upon with a force is predetermined by the design of the supporting element and wherein the surface extension of the guide surface is of such a size that in all the positions of the slide elements relative to one another the supporting element acts on the guide surface with the same surface extension.

5. Machine tool as defined in claim 1, wherein at least one of the supporting elements is adjustable relative to the second slide element.

6. Machine tool as defined claim 1, wherein the at least one guide surface extending parallel to the cross slide movement surface is designed as at least one sliding surface and wherein the second slide element is guided by at least one sliding support surface of the supporting element resting on the at least one sliding surface so as to be non-tiltable relative to the cross slide movement surface but displaceable therein two-dimensionally.

7. Machine tool as defined in claim 6, wherein the sliding support surface has a smaller surface extension than the sliding surface and wherein the sliding support surface rests on the sliding surface over its entire area in each position of the slide elements relative to one another.

8. Machine tool as defined in claim 1, wherein the supporting element is arranged on the slide element bearing the second receiving means.

9. Machine tool as defined in claim 1, wherein the cross slide movement surface extends parallel to a plane of movement defined by an X axis and a Z axis of the machine tool.

10. Machine tool for the machining of a workpiece by way of a relative movement between the workpiece and a tool, comprising:
    a machine frame,
    support arranged on the machine frame and having a first receiving means for the workpiece or the tool,
    a cross slide system arranged on the machine frame,
    a second receiving means for the tool or the workpiece, said second receiving means being movable by the cross slide system relative to the first receiving means in the direction of two cross slide movement axes extending transversely to one another in a movement zone of a cross slide movement surface determined by maximum paths in these cross slide movement directions,
    the cross slide system comprising two slide elements, one of said slide elements being supported on the machine frame and having an opening and the other of the slide elements bearing a base member provided with a second receiving means, said base member passing through said opening,
    said slide elements being movable on one another by a single two-dimensional guidance system, said guidance system enabling movement in the direction of both cross slide movement axes, said guidance system determining the precision of guidance of the second receiving means parallel to the cross slide movement surface,
    a drive device, said drive device enabling the slide element bearing the second receiving means to be moved and fixed in position relative to the other slide element in the two cross slide movement directions with a defined alignment of the slide elements relative to one another, and
    a drive for the tool or the workpiece to be mounted in the second receiving means located on a side of the base member opposite the second receiving means.

11. Machine tool as defined in claim 10, wherein the one receiving means is designed as a workpiece spindle and the other receiving means as a tool carrier.

12. Machine tool as defined in claim 11, wherein the cross slide movement surface extends parallel to a spindle axis of the receiving means and parallel to a direction transverse to the spindle axis.

13. Machine tool as defined in claim 1, wherein a holding down device is provided for keeping the at least one supporting element in contact with the at least one guide surface.

14. Machine tool as defined in claim 13, wherein the holding down device keeps the supporting element in contact with the guide surface by acting upon it with a force.

15. Machine tool as defined in claim 14, wherein the holding down device has at least one additional guide surface extending parallel to the cross slide movement surface, the surface extension of said additional guide surface in the direction of the cross slide movement directions corresponding at least to the surface extension of the movement zone, and has an additional supporting element acting on the guide surface.

16. Machine tool as defined in claim 15, wherein the additional guide surface is arranged on the first slide element and the additional supporting element on the second slide element.

17. Machine tool as defined in claim 16, wherein the first slide element is provided with the guide surface on one side and with the additional guide surface on the opposite side.

18. Machine tool as defined in claim 16, wherein the guide surface and the additional guide surface are arranged on a base member of the first slide element so as to face one another.

19. Machine tool for the machining of a workpiece by way of a relative movement between the workpiece and a tool, comprising:
    a machine frame,
    a support arranged on the machine frame and having a first receiving means for the workpiece or the tool,
    a cross slide system arranged on the machine frame and being provided with a second receiving means for the tool or the workpiece, said second receiving means being movable by the cross slide system relative to the first receiving means in the direction of two cross slide movement axes extending transversely to one another in a movement zone of a cross slide movement surface determined by maximum paths in these cross slide movement directions,
    the cross slide system comprising two slide elements, one of said slide elements being supported on the machine frame and the other slide element bearing the second receiving means, the slide elements being movable on one another by a single two-dimensional guidance system, said guidance system enabling movement in the direction of both cross slide movement axes, said guidance system determining the precision of guidance of the second receiving means parallel to the cross slide movement surface, and
    a drive device, said drive device enabling the slide element bearing the second receiving means to be moved and fixed in position relative to the other slide element in the two cross slide movement directions with a defined alignment of the slide elements relative to one another, the drive device engaging on a side of the slide element bearing the second receiving means located opposite the second receiving means.

20. Machine tool for the machining of a workpiece by way of a relative movement between the workpiece and a tool, comprising:
    a machine frame,
    a support arranged on the machine frame and having a first receiving means for the workpiece or the tool,
    a cross slide system arranged on the machine frame and being provided with a second receiving means for the tool or the workpiece, said second receiving means being movable by the cross slide system relative to the first receiving means in the direction of two cross slide movement axes extending transversely to one another in a movement zone of a cross slide movement surface determined by maximum paths in these cross slide movement directions,
    the cross slide system comprising two slide elements, one of said slide elements being supported on the machine frame and the other slide element bearing the second receiving means, the slide elements being movable on one another by a single two-dimensional guidance system, said guidance system enabling movement in the direction of both cross slide movement axes, said guidance system determining the precision of guidance of the second receiving means parallel to the cross slide movement surface, and
    a drive device, said drive device being arranged on a side of the slide element supported on the machine frame located opposite the second receiving means,
    said drive device enabling the slide element bearing the second receiving means to be moved and fixed in position relative to the other slide element in the two cross slide movement directions with a defined alignment of the slide elements relative to one another.

21. Machine tool for the machining of a workpiece by way of a relative movement between the workpiece and a tool, comprising:
    a machine frame,
    a support arranged on the machine frame and having a first receiving means for the workpiece or the tool,
    a cross slide system arranged on the machine frame and being provided with a second receiving means for the tool or the workpiece, said second receiving means being movable by the cross slide system relative to the first receiving means in the direction of two cross slide movement axes extending transversely to one another in a movement zone of a cross slide movement surface determined by maximum paths in these cross slide movement directions,
    the cross slide system comprising two slide elements, one of said slide elements being supported on the machine frame and the other slide element bearing the second receiving means, the slide elements being movable on one another by a single two-dimensional guidance system, said guidance system enabling movement in the direction of both cross slide movement axes, said guidance system determining the precision of guidance of the second receiving means parallel to the cross slide movement surface, and
    a drive device, said drive device enabling the slide element bearing the second receiving means to be moved and fixed in position relative to the other slide element in the two cross slide movement directions with a defined alignment of the slide elements relative to one another, the drive device being arranged on a side of a machine base member located opposite the second receiving means, the slide element supported on the machine frame being fixed on said machine base member.

22. Machine tool as defined in claim 20, wherein the drive device is designed such that it always moves the slide elements in the same alignment relative to one another.

23. Machine tool as defined in claim 22, wherein the drive device forms at least a partial mechanical parallel guide means for the slide elements.

24. Machine tool as defined in claim 22, wherein the drive device engages on the slide element bearing the second receiving means at at least two points of engagement which points of engagement are arranged at a distance from one another with three drive arms extending in at least two different directions, said drive device being activatable by a machine control and having an articulated head and wherein the points of engagement are positionable in a defined manner relative to the first slide element by means of the three drive arms.

25. Machine tool as defined in claim 24, wherein each of the drive arms is, for its part, articulatedly mounted with a pivot bearing relative to the other slide element and a linear drive is associated with each of the drive arms.

26. Machine tool as defined in claim 25, wherein the pivot bearings are arranged so as to be stationary relative to the other slide element and wherein the drive arms are designed to be variable in length by means of the associated linear drive.

27. Machine tool as defined in claim 26, wherein the drive arms are adjustable by means of a spindle drive so as to be variable in length.

28. Machine tool as defined in claim 26, wherein a drive motor for the linear drive is arranged in the region of the pivot bearing.

29. Machine tool as defined in claim 26, wherein two of the drive arms form a parallelogram guide means.

30. Machine tool as defined in claim 29, wherein the drive arms are synchronously adjustable in length by way of the machine control.

31. Machine tool as defined in claim 10, wherein said guidance system comprises:
   guide surfaces located on said slide element having said opening on both sides of said opening; and
   support surfaces located on said other of the slide elements.

* * * * *